(12) United States Patent
Shin et al.

(10) Patent No.: US 8,413,246 B2
(45) Date of Patent: Apr. 2, 2013

(54) EVALUATING SHELLCODE FINDINGS

(75) Inventors: Jinwook Shin, Redmond, WA (US); John Joseph Lambert, Redmond, WA (US); Joshua Lackey, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 12/819,234

(22) Filed: Jun. 21, 2010

(65) Prior Publication Data

US 2011/0314544 A1  Dec. 22, 2011

(51) Int. Cl.
*G06F 21/00* (2006.01)

(52) U.S. Cl. .......................... 726/24; 713/188

(58) Field of Classification Search .................. 726/24; 713/188
See application file for complete search history.

(56) References Cited

U.S. PATENT DOCUMENTS

| | | | |
|---|---|---|---|
| 7,225,468 B2 | 5/2007 | Waisman et al. | |
| 7,555,777 B2 | 6/2009 | Swimmer et al. | |
| 2006/0069912 A1 | 3/2006 | Zheng et al. | |
| 2008/0022405 A1 | 1/2008 | Wang et al. | |
| 2009/0024549 A1* | 1/2009 | Johnson | 706/46 |
| 2010/0031359 A1 | 2/2010 | Alme | |
| 2011/0185418 A1* | 7/2011 | Boteler et al. | 726/22 |

OTHER PUBLICATIONS

Forest, Damien et al., "HoneySift: A fast approach for low interation client based Honeypot," date unknown, pp. 1-13.*

Song, et al., "On the Infeasibility of Modeling Polymorphic Shellcode for Signature Detection", Retrieved at << http://www1.cs.columbia.edu/~yingbo/publications/cucs-007-07.pdf >>, Technical Report, CUCS-007-07, Feb. 2007, pp. 1-20.

Ratanaworabhan, et al., "NOZZLE: A Defense Against Heap-spraying Code Injection Attacks", Retrieved at << http://www.csl.cornell.edu/~paruj/papers/usenix-security09.pdf >>, In Security '09, Proceedings of the 18th USENIX Security Symposium, 2009, pp. 18.

Li, et al., "SPARSE: A Hybrid System to Detect Malcode-Bearing Documents", Retrieved at << http://app.cul.columbia.edu:8080/ac/bitstream/10022/AC:P:29545/1/504.pdf >>, CU Technical Report, Jan. 2008, pp. 1-20.

Maggi, et al., "Detecting Intrusions through System Call Sequence and Argument Analysis", Retrieved at << http://chrome.ws.dei.polimi.it/images/0/08/Maggi_2009_IEEE-TDSC.pdf >>, IEEE Transactions on Dependable and Secure Computing, Nov. 5, 2008, pp. 1-15.

* cited by examiner

*Primary Examiner* — Michael Pyzocha
(74) *Attorney, Agent, or Firm* — Hope Baldauff Hartman, LLC

(57) ABSTRACT

Concepts and technologies are described herein for evaluating shellcode findings. In accordance with the concepts and technologies disclosed herein, shellcode findings can be evaluated to determine if the shellcode findings are legitimate, or if the shellcode findings are false positive shellcode findings. Legitimate shellcode findings can be determined based not simply upon patterns associated with the suspected shellcode itself, but also based upon a pattern of bit-level entropy in the memory around the suspected shellcode. Mathematical models of the memory can be generated and analyzed to determine if the shellcode finding is legitimate.

20 Claims, 5 Drawing Sheets

EVALUATING SHELLCODE FINDINGS

BACKGROUND

The word "shellcode" is used to refer generally to malicious software written in assembly language. Attackers rely upon execution of shellcode on a host computer as one way of attempting to gain control over one or more aspects of the host computer. Shellcode can be embedded in machine code such as downloaded files.

Various mechanisms are relied upon to prevent attacks based upon execution of shellcode on computers. One mechanism used to identify shellcode includes shellcode scanners, which are used to scan machine instructions, memory, virtual memory, memory devices, and the like, for shellcode. The shellcode scanners search machine instructions for patterns or sequences of machine instructions, also referred to as shellcode "signatures". For example, shellcode scanners may search for specific sequences of masked bytes of machine instructions via binary pattern matching methods, which may be known to be associated with shellcode.

While the above-described shellcode scanners are relatively effective in recognizing shellcode, these scanners also may falsely identify harmless code as shellcode, thereby resulting in false positive shellcode findings. For example, analyzed machine code may contain a benign byte sequence in a non-image region that some shellcode scanners may mistakenly detect as malicious code. If only a traditional shellcode scanner is used to analyze this machine code, this benign byte sequence may be deleted or quarantined, or may trigger manual review to determine if the byte sequence actually is malicious. Thus, valuable computer and/or human resources may be wasted evaluating harmless code.

It is with respect to these and other considerations that the disclosure made herein is presented.

SUMMARY

Concepts and technologies are described herein for evaluating shellcode findings. In accordance with the concepts and technologies disclosed herein, shellcode findings can be evaluated to determine if the shellcode findings are legitimate, or if the shellcode findings are false positive shellcode findings. Legitimate shellcode findings can be determined based not simply upon patterns associated with the suspected shellcode itself, but also based upon a pattern of bit-level entropy in the memory around the suspected shellcode. Mathematical models of the memory can be generated and analyzed to determine if the shellcode finding is legitimate. Two levels of analysis can be completed to determine if the shellcode finding is legitimate, wherein the shellcode finding can be determined to be legitimate in either step of the analysis. In some embodiments, a shellcode finding is ruled a false positive shellcode finding only after the shellcode finding is analyzed using both steps of the analysis.

According to one aspect, a shellcode scanner analyzes computer readable instructions such as a memory dump, a memory location, or other computer readable instructions to search for shellcode. If the shellcode scanner identifies any suspected shellcode, the shellcode scanner can generate output ("shellcode finding") that indicates that a suspected shellcode has been found, as well as a location at which the shellcode is located. The location can include a memory address, a line in code, or the like. The shellcode finding can be passed to a test engine to determine if the shellcode finding is legitimate, or if the shellcode finding is a false positive shellcode finding.

According to another aspect, the test engine is configured to perform either or both of two levels of analysis on the shellcode finding to determine whether the shellcode finding is a legitimate or a false positive shellcode finding. In a first level of analysis, the test engine obtains a number of samples from around the location at which the shellcode is identified. The bit-level entropy of the memory at the samples is measured. The test engine mathematically derives a function that fits to the samples modeling the bit-level entropy of the memory. The derived function is referred to as a shellcode curve. In some embodiments, the function, or shellcode curve, is a cubic spline, and the polynomials used to define the spline span from the bit-level entropy value of one sample to the bit-level entropy value of an adjacent sample. Thus, if there are n samples taken from the memory, the cubic spline will be formed from (n−1) polynomials.

The test engine mathematically fits an optimal normal distribution graph to the cubic spline using a self aligning algorithm that is recursively applied until the optimal normal distribution is identified. In some embodiments, the test engine uses a hill climbing approach to center the algorithm on the optimal normal distribution graph. Once the optimal normal distribution graph is identified, the test engine determines the difference between the optimal normal distribution and the shellcode curve, and compares the difference to a system-defined threshold value. If the difference between the normal distribution and the shellcode curve is less than the threshold value, the shellcode finding is confirmed as legitimate. If the difference between the normal distribution and the shellcode curve is greater than the threshold value, the shellcode finding is confirmed as a false positive.

In some embodiments, the calculated difference is associated with a confidence level. If the confidence level associated with the difference is greater than a system-defined confidence threshold, the shellcode finding may be verified as legitimate or determined to be a false positive shellcode finding, in accordance with the determined difference. If a confidence level associated with the difference is less than a system-defined confidence threshold, a threshold-free analysis can be performed to determine if the shellcode finding is legitimate or a false positive shellcode finding.

According to another aspect, the threshold-free analysis involves using a number of normal distribution graphs, instead of identifying an optimal normal distribution graph. The test engine identifies a number of values corresponding to the differences between the normal distribution graphs and the shellcode curve. The test engine mathematically determines a line function corresponding to the computed differences. The line function represents two straight lines with one global minimum. If the slope of the first straight line is negative, the slope of the second straight line is positive, and the global minimum is near the center of the domain of the line function, the test engine confirms the shellcode function as legitimate. Otherwise, the test engine determines that the shellcode function is a false positive shellcode finding.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
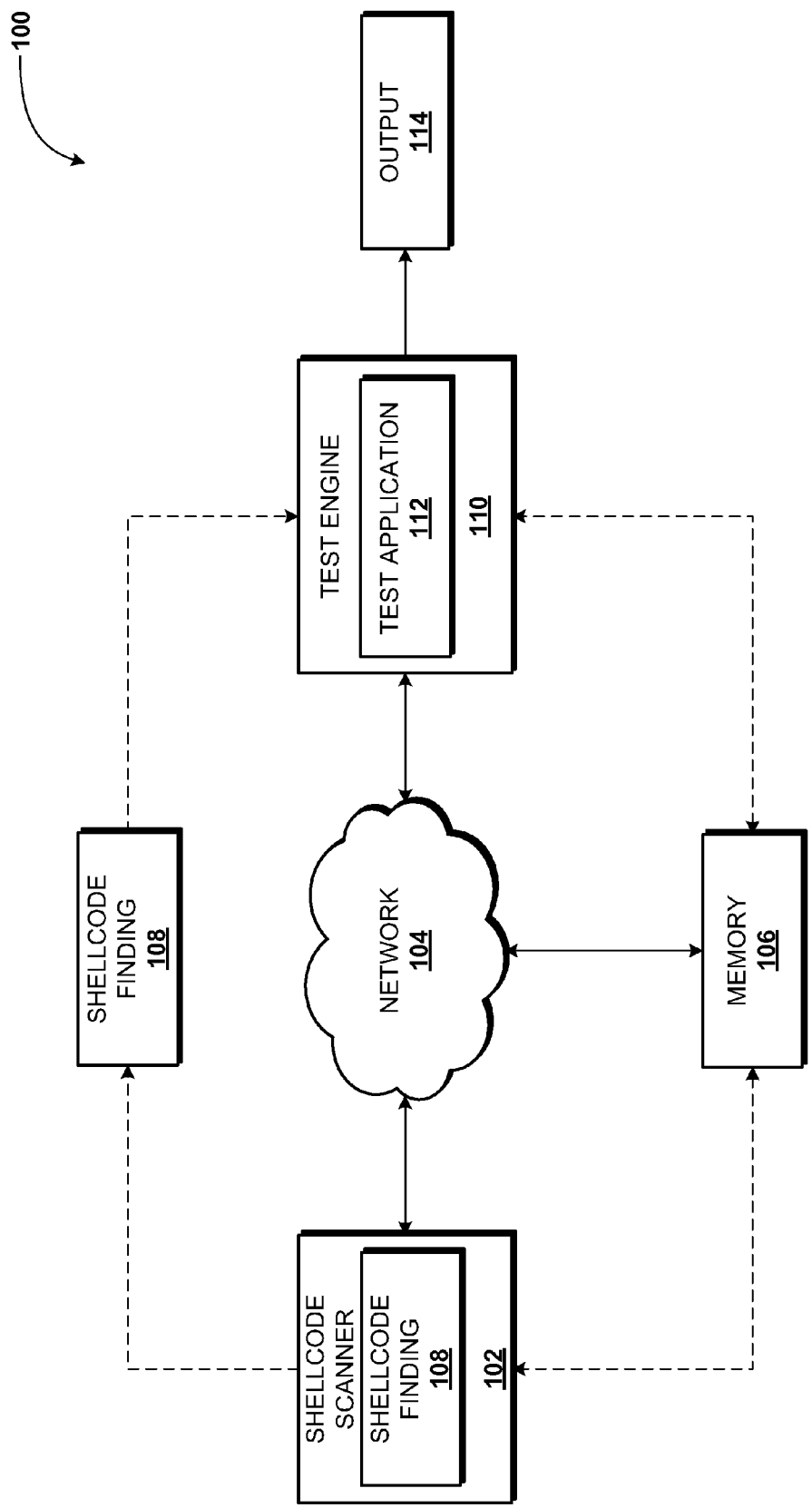
FIG. 1 is a system diagram illustrating an exemplary operating environment for the various embodiments disclosed herein.

Concepts and technologies are described herein for evaluating shellcode findings. In accordance with the concepts and technologies disclosed herein, shellcode findings can be evaluated to determine if the shellcode findings are legitimate, or if the shellcode findings are false positive shellcode findings. Legitimate shellcode findings can be determined based upon an analysis of bit-level entropy in the memory around the suspected shellcode, as well as a pattern associated with the entropy. Mathematical models of the memory can be generated and analyzed to determine if the shellcode finding is legitimate. Two levels of analysis can be completed to determine if the shellcode finding is legitimate, wherein the shellcode finding can be determined to be legitimate in either step of the analysis. In some embodiments, a shellcode finding may be ruled a false positive shellcode finding only after the shellcode finding is analyzed using both steps of the analysis.

A shellcode scanner analyzes computer readable instructions such as a memory dump, a memory location, or other computer readable instructions to search for shellcode. The shellcode scanner can employ a heuristic or signature based scan of the memory to identify suspected shellcode. If the shellcode scanner identifies any suspected shellcode, the shellcode scanner can generate a shellcode finding that indicates that a suspected shellcode has been identified, and where the suspected shellcode is located. The shellcode finding can be passed to a test engine to determine whether the shellcode finding is a legitimate or a false positive shellcode finding.

The test engine is configured to perform one or more levels of analysis on the shellcode finding to determine whether the shellcode finding is a legitimate or a false positive shellcode finding. In a first level of analysis, the test engine obtains a number of memory samples from around the memory location at which the shellcode is identified, and measures the bit-level entropy of the memory at the samples. The test engine mathematically generates a shellcode curve function that fits to the samples modeling the bit-level entropy of the memory. In some embodiments, the function is a cubic spline, and the polynomials used to define the spline span from the bit-level entropy value of one sample to the bit-level entropy value of an adjacent sample.

The test engine fits an optimal normal distribution graph to the cubic spline using a self aligning algorithm that is recursively applied until the optimal normal distribution is identified. Once the optimal normal distribution graph is identified, the test engine determines the difference between the optimal normal distribution and the shellcode curve, and compares the difference to a system-defined threshold value. If the difference between the normal distribution and the shellcode curve is less than the threshold value, the shellcode finding is confirmed as legitimate. If the difference between the normal distribution and the shellcode curve is greater than the threshold value, the shellcode finding is confirmed as a false positive.

In some embodiments, the calculated difference is associated with a confidence level. If the confidence level associated with the difference is greater than a system-defined confidence threshold, the shellcode finding may be verified as legitimate or determined to be a false positive shellcode finding, in accordance with the determined difference. If the confidence level associated with the difference is less than a system-defined confidence threshold, a threshold-free analysis can be performed to determine if the shellcode finding is legitimate or a false positive shellcode finding.

In a second level of analysis, the test engine applies the threshold-free analysis, which involves using a number of normal distribution graphs instead of identifying an optimal normal distribution graph. The test engine identifies a number of values corresponding to the differences between the normal distribution graphs and the shellcode curve. The test engine mathematically determines a line function corresponding to the computed differences. The line function represents two straight lines with one global minimum. If the slope of the first straight line is negative, the slope of the second straight line is positive, and the global minimum is near the center of the domain of the line function, the test engine confirms the shellcode function as legitimate. Otherwise, the test engine determines that the shellcode function is a false positive shellcode finding.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for evaluating shellcode findings will be presented.

Referring now to FIG. 1, aspects of one operating environment 100 for the various embodiments presented herein will be described. The operating environment 100 includes a shellcode scanner 102 operating on or in communication with a network 104. According to various embodiments, the shellcode scanner 102 is a personal computer ("PC") such as a desktop, tablet, or laptop computer system. The shellcode scanner 102 may include other types of computing systems including, but not limited to, server computers, handheld computers, netbook computers, embedded computer systems, personal digital assistants, mobile telephones, smart phones, or other computing devices.

The shellcode scanner 102 is configured to execute one or more programs or applications (not illustrated) to scan a memory 106 for shellcode. The memory 106 can include one or more memory devices or computer-readable media (as defined herein) associated with the shellcode scanner 102. Thus, it should be understood that the memory 106 can be embodied as part of the shellcode scanner 102. The memory 106 also can include machine code corresponding to a memory dump or other data associated with a memory device. Furthermore, the memory 106 may be embodied as a one or more components of a computer or storage device that is remote from the shellcode scanner 102. Thus, the functionality of the memory 106 also can be provided by one or more databases, server computers, desktop computers, mobile telephones, laptop computers, other computing systems, and the like.

The shellcode scanner 102 analyzes the memory 106 to identify shellcode in the memory 106. According to various embodiments disclosed herein, the shellcode scanner 102 identifies shellcode in the memory 106, and generates output indicating that shellcode has been identified 108 ("shellcode findings"). In addition to indicating that shellcode has been identified in the memory 106, the shellcode findings 108 also identify one or more memory addresses associated with the shellcode, or offsets from the start of memory. The memory addresses or offsets from the start of memory identify one or more locations at which the shellcode is located in the memory 106 or in another device providing the functionality thereof.

According to various embodiments, the operating environment 100 also includes a test engine 110 operating on or in communication with the network 104. The test engine 110 also can operate in communication with the memory 106 via the network 104 and/or via a direct link. The test engine 110 is configured to execute an operating system (not illustrated) and one or more application programs such as, for example, a test application 112, and/or other application programs. The operating system is a computer program for controlling the operation of the test engine 110.

The test application 112 is an executable program configured to execute on top of the operating system to provide the functionality described herein for detecting false positive shellcode. The test application 112 is configured to receive the shellcode findings 108 from the shellcode scanner 102. The test application 112 also is configured to access the memory 106. The test application 112 analyzes the memory 106 to determine if the shellcode findings 108 are or are not legitimate.

In some embodiments, the test engine 110 acts as a second layer of testing for the memory 106, during which shellcode findings 108 identified in a first layer of testing performed by the shellcode scanner 102 are verified or invalidated. In other embodiments, the test engine 110 includes a signature scanning application that provides functionality substantially similar to the shellcode scanner 102. In the second analysis, the test engine 110, and/or the test application 112, tests the memory 106 at the addresses specified by the shellcode findings 108. The shellcode findings 108 can be tested one or more at a time.

As mentioned above, the shellcode findings 108 identify a memory address of a suspected shellcode. The test application takes a number of samples from the memory 106. The samples are taken from locations near the address of the suspected shellcode as indicated in the shellcode finding 108. The number of samples taken from the memory 106 can be determined according to various methods.

The test application 112 measures bit-level entropy for each of the samples, and builds a shellcode curve function for the shellcode, wherein the shellcode curve function is defined as a cubic spline with piecewise polynomials between the samples. The test application 112 then mathematically determines and fits an optimal normal distribution graph to the determined shellcode curve function, and computes a difference between the normal distribution and the shellcode curve function. The difference between the normal distribution and the shellcode curve is compared to a system-defined threshold value, and the test application 112 determines a confidence level associated with this comparison. According to various embodiments disclosed herein, the confidence level decreases as the difference between the normal distribution and the shellcode curve approaches the system-defined threshold value.

A confidence threshold for the comparison between the normal distribution and the shellcode curve can be defined as almost any value, which may be chosen based upon empirical analysis, system or user preferences, or other considerations. The test application 112 compares the difference between the normal distribution and the shellcode curve to the system-defined threshold value. If the difference between the normal distribution and the shellcode curve is less than the system-defined threshold, the test application 112 verifies the shellcode finding 108 as legitimate. If the difference between the normal distribution and the shellcode curve is greater than the system-defined threshold, the test application 112 determines the shellcode finding 108 to be a false positive shellcode finding 108.

The test application 112 also can compare the confidence level associated with the difference between the normal distribution and the shellcode curve to the system-defined confidence threshold. If the difference between the normal distribution and the shellcode curve is less than the system-defined threshold value, and the confidence level exceeds the system-defined confidence threshold, the test application 112 verifies the shellcode finding 108 as legitimate. If the difference between the normal distribution and the shellcode curve is greater than the system-defined threshold value, and the confidence level exceeds the system-defined confidence threshold, the test application 112 determines the shellcode finding 108 to be a false positive shellcode finding. If the confidence level is less than a system-defined confidence threshold, the test application 112 can perform an additional analysis on the shellcode finding 108 to verify or invalidate the shellcode finding 108.

During the additional analysis, a number of normal distribution graphs are used to compute a corresponding number of difference values between the normal distribution graphs and the shellcode curve. The test application 112 uses a linear least squares approach to derive a line function corresponding to the differences. The line function includes two straight lines and a global minimum. The test application 112 analyzes the pattern of the line function to determine if the pattern is consistent with legitimate shellcode findings. The test application 112 generates output 114 indicating whether the shellcode is verified as legitimate or invalidated as not legitimate.

FIG. 1 illustrates one shellcode scanner 102, one network 104, one memory 106, and one test engine 110. It should be understood, however, that some implementations of the operating environment 100 include multiple shellcode scanners 102, multiple networks 104, multiple memory devices 106, and/or multiple test engines 110. Therefore, the illustrated embodiment should be understood as being exemplary, and should not be construed as being limiting in any way.

Figure 2:
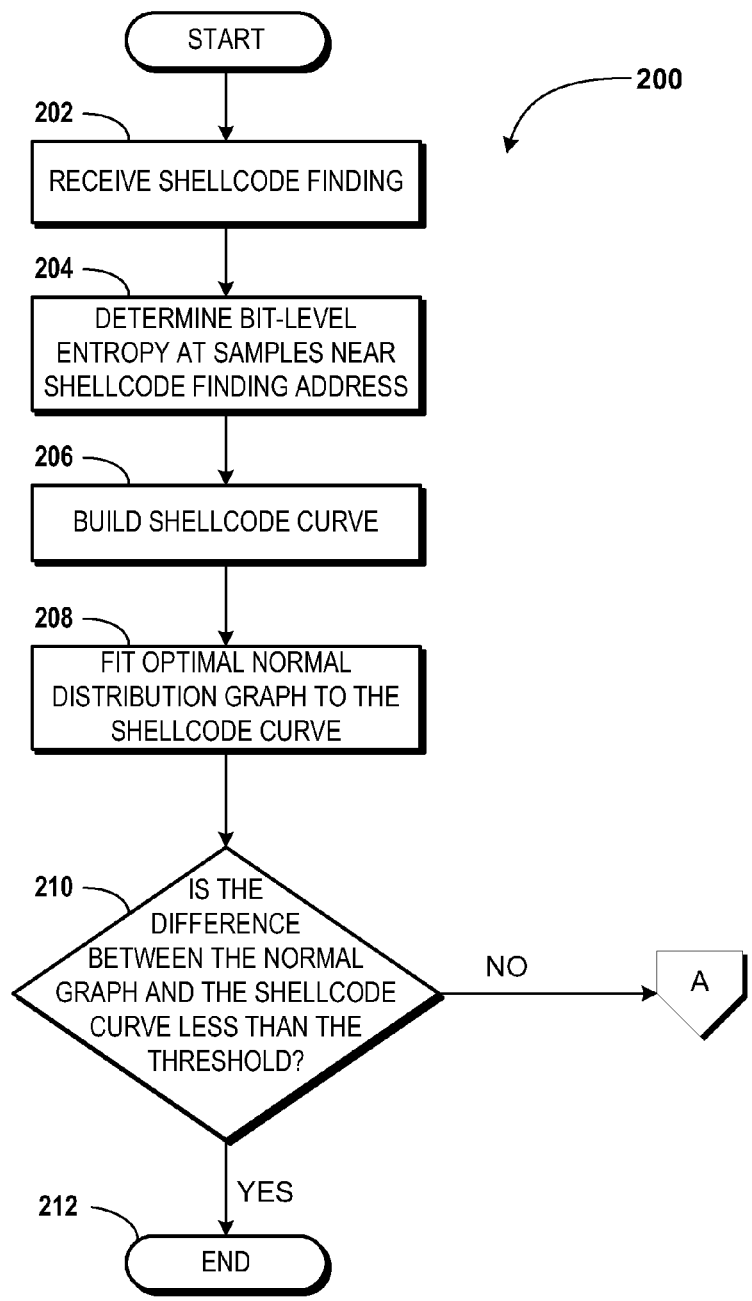
FIG. 2 is a flow diagram showing aspects of a method for detecting false positive shellcode findings, according to an exemplary embodiment.

Turning now to FIG. 2, aspects of a method 200 for detecting false positive shellcode findings will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the test engine 110. It should be understood that these embodiments are exemplary, and should not be viewed as being limiting in any way. The method 200 begins at operation 202, wherein the test engine 110 receives a shellcode finding 108. As explained above, the shellcode finding 108 can be received from a shellcode scanner 102 or other test device.

The shellcode finding 108 indicates that the shellcode scanner 102 identified a suspected shellcode. The shellcode finding 108 also may indicate an address at which the suspected shellcode is located in the memory 106. For example, the shellcode finding 108 may indicate that the suspected shellcode is located at an address A in the tested memory 106. It should be understood that this embodiment is exemplary, and should not be construed as being limiting in any way.

From operation 202, the method 200 proceeds to operation 204, wherein the test engine 110 takes a number n of memory samples from the memory 106, and determines the bit-level entropy of the memory 106 at each of the n samples. The n samples are selected from the memory 106 at locations near the address A. In some embodiments, the test engine 110 selects the samples from the memory 106 at addresses within a lower bound l and an upper bound u, wherein l<A<u. The number of samples, and the degree of proximity to the address A can be determined based upon various methods.

As mentioned above, the test engine 110 measures the bit-level entropy of the memory at each of the samples. In some embodiments, the bit-level entropy is defined as $$H_i(Y) = -\sum_{j=0}^{255} p(x_j) \log_2 p(x_j),$$

where Y is the discrete random variable with $\{j|0, 1, \ldots 255\}$ and $p(x_j)$ is the probability that $Y=j$. Thus, for each of the n samples selected in operation 202, the test engine 110 generates a value representing the bit-level entropy of the memory 106 at a location in memory 106 corresponding to the respective sample.

From operation 204, the method 200 proceeds to operation 206, wherein the test engine 110 builds a shellcode curve function ("shellcode curve"). The test engine 110 generates the shellcode curve as a cubic spline with (n−1) piecewise polynomials. The (n−1) polynomials are generated between the n bit-level entropy values corresponding to the n samples evaluated above. According to some embodiments, the test engine 110 determines the shellcode curve as $$F(x) = \begin{cases} F_1(x) = a_1(x-x_1)^3 + b_1(x-x_1)^2 + c_1(x-x_1) + d_1, & x \in [x_1, x_2] \\ \ldots \\ F_{(n-1)}(x) = a_{(n-1)}(x-x_{(n-1)})^3 + b_{(n-1)}(x-x_{(n-1)})^2 + c_{(n-1)}(x-x_{(n-1)}) + d_{(n-1)}, & x \in [x_{(n-1)}, x_n] \end{cases}$$

where $F_1(x_1)=H_1(x_1), \ldots, F_{(n-1)}(x_{(n-1)})=H_{(n-1)}(x_{(n-1)})$. Thus, the shellcode curve (F(x)) is expressed as (n−1) polynomials, wherein the value of $F(x_1)$, i.e., the value of F(x) at a first sample $x_1$, is equal to the measured bit-level entropy at the first sample, the $F(x_2)$ is equal to the measured bit-level entropy at the second sample, and so forth. The coefficients $a_1, b_1, c_1, d_1, \ldots, a_{(n-1)}, b_{(n-1)}, c_{(n-1)}$, and $d_{(n-1)}$ are computed using known methods for computing unknown coefficients.

More particularly, F(x) has 4*(n−1) unknown coefficients for (n−1) sub-equations. It is known that 4*(n−1) constraints are needed to find the 4*(n−1) unknown coefficients. To identify the unknowns coefficients, let the i-th sub-equation be $F_i(x)$. The n samples are $(x_1, y_1), (x_i, y_i), \ldots, (x_n, y_n)$. The first two constraints from each sub-equation are $F_i(x_i)=y_i$ and $F_i(x_{(i+1)})=y_{(i+1)}$. This is because F(x) is continuous at both ends of $F_i(x)$. Because F(x) is a cubic spline, F'(x) and F''(x) are continuous. i.e., $F'_{(i-1)}(x_i)=F'_i(x_i)$ and $F''_{(i-1)}(x_i)=F''_i(x_i)$ for i=2, 3, . . . , n−1. Additionally, the second derivatives at the endpoints are 0. In other words, $F''_1(x_1)=0$, and $F''_{(n-1)}(x_n)=0$. Thus, all 4*(n−1) unknown coefficients are solved. It should be understood that the $d_i$ are the measured bit-level entropy for $F_i$. Thus, $F_i(x_i)=d_i$ by construction.

From operation 206, the method 200 proceeds to operation 208, wherein the test engine 110 determines and fits an optimal normal distribution curve to the shellcode curve determined in operation 206. According to some implementations, curves corresponding to most legitimate shellcodes are roughly equivalent to a distribution. In one embodiment, for example, the distribution is a normal distribution. For purposes of illustration, the embodiments described herein use a normal distribution. In light of the above, it should be understood that his example is illustrative, and should not be construed as being limiting in any way. In the exemplary embodiment, the test engine 110 evaluates the shellcode curve to determine if the shellcode curve is similar to a normal distribution, and therefore legitimate.

The test engine 110 determines the optimal normal distribution by starting with an initial normal distribution graph $$g_0(x) = \frac{1}{\sigma_0 \sqrt{2\pi}} e^{\frac{-(x-x_{max})^2}{2\sigma_0^2}}$$

with the mean $\mu=x_{max}$ and the standard deviation $\sigma=\sigma_0$ is used, where $F(x_{max}) \geq F(x)$ for all x, and $l<x_{max}<u$. During application of this algorithm by the test engine 110, the test engine 110 aligns F(x) with $g_0(x)$ along the center line $x=x_{max}$.

The test engine 110 also applies a scaling process where the normal scale C is computed as $$C = \frac{F(x\max)}{g_0(x\max)}$$

and $g_0(x)$ is scaled by C such that, $G_0(x)=Cg_0(x)$. After aligning and scaling, the test engine 110 is now able to compute the difference value between the initial normal distribution graph $G_0(x)$ and the shellcode curve F(x). The difference value can be computed by $$\int_l^u |G_0(x) - F(x)| dx = \int_l^u \left| \frac{1}{\sigma_0 \sqrt{2\pi}} e^{\frac{-(x-x_{max})^2}{2\sigma_0^2}} - F(x) \right| dx.$$

For an arbitrary normal distribution function with σ, the error function that computes the difference value can be defined as $$E(\sigma) = \int_l^u |G(x) - F(x)| dx = \int_l^u \left| \frac{1}{\sigma \sqrt{2\pi}} e^{\frac{-(x-x_{max})^2}{2\sigma^2}} - F(x) \right| dx.$$

The test engine 108 recursively applies hill climbing algorithm to find the optimal normal distribution graph G(x) that minimizes the difference between G(x) and F(x). by adjusting the standard deviation parameter σ of G(x) between $\sigma_0$ and $\sigma_{max}$.

From operation 208, the method 200 proceeds to operation 210, wherein the test engine 110 determines if the difference E(σ) between the optimal normal distribution and the shellcode curve exceeds or does not exceed a system-defined threshold value T. The threshold value T can be a value that is set based upon almost any considerations. Thus, the threshold value T can be almost any value. In some embodiments, the test engine 110 determines if the absolute value of the difference E(σ) between the shellcode curve and the optimal normal distribution exceeds or does not exceed the threshold value T, which the test engine 110 can determine by calculating $$E(\sigma) = \int_l^u |G(x) - F(x)| dx < T.$$

If the absolute value of the difference E(x) between the shellcode curve and the optimal normal distribution is less than the system-defined threshold value T, the test engine 110 determines the shellcode to be legitimate, and the method 200 proceeds to operation 212, wherein the method 200 ends. If the value of the difference E(σ) between the shellcode curve and the optimal normal distribution is not less than the system-defined threshold value T, the test engine 110 determines the shellcode to possibly be a false positive shellcode finding 108. For shellcode findings 108 determined to be possibly false positive, the method 200 ends and the test engine 110 can provide the functionality described below with respect to FIG. 3.

Although not illustrated in FIG. 2, the method 200 also can include analysis of one or more confidence levels and/or confidence thresholds. In some embodiments, for example, the test engine 110 determines a confidence level c associated with the value of the difference E(σ) between the shellcode curve and the optimal normal distribution. The closer E(σ) is to the system-defined threshold value T, the lower the confidence level c. The test engine 110 compares the confidence level c to a system-defined confidence threshold C. If the computed confidence level c is less than the confidence threshold C then the shellcode finding at the address A is possibly false and possibly legitimate, subject to further analysis. The method 200 ends, and the test engine 110 can provide the functionality described below with reference to FIG. 3.

According to some embodiments, the method 200 is sufficient to identify some false positive shellcode findings. In some cases, however, the hill climbing approach used to identify the optimal normal distribution may self align on a local minimum, instead of a global minimum. Thus, the process of identifying the optimal normal distribution graph may terminate with a non-optimal normal distribution graph, thereby skewing the results of the analysis set forth above.

Additionally, the threshold value T is chosen based upon system or user preferences, empirical analysis, or other methods. In some embodiments, the threshold value T may be too large or too small for particular types of shellcode and/or datasets. To address these possible complications, the test engine 110 is configured to further analyze some or all shellcode findings using a threshold-free approach, as set forth below with reference to FIG. 3. The method 200 ends at operation 212.

Figure 3:
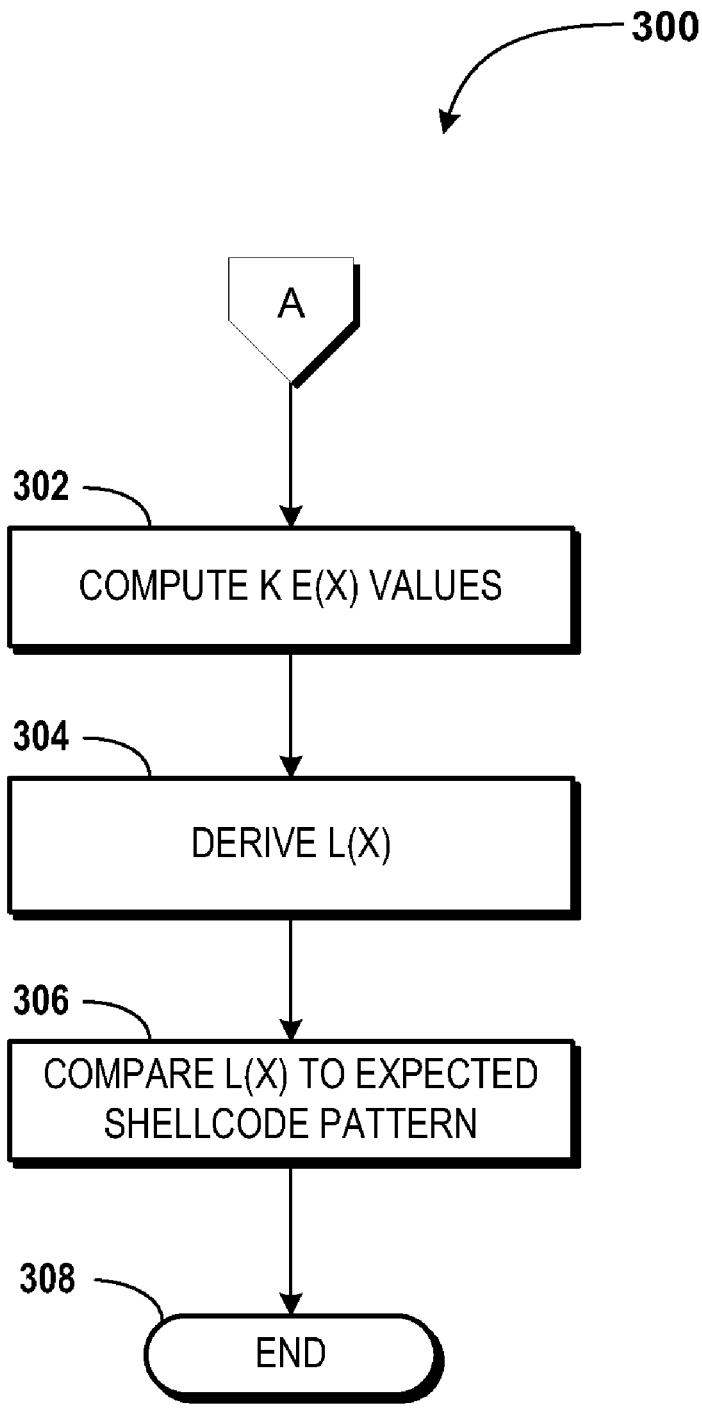
FIG. 3 is a flow diagram showing aspects of a method for detecting false positive shellcode findings, according to another exemplary embodiment.

Turning now to FIG. 3, aspects of a method 300 for evaluating a suspected shellcode finding will be described in detail, according to another exemplary embodiment. While the operations of the method 300 are described herein as being performed to further evaluate a suspected shellcode finding, it should be understood that the threshold-free approach described in FIG. 3 can be used instead of the threshold approach described above with reference to FIG. 2. Thus, the illustrated embodiment, wherein the threshold-free analysis is performed in addition to the threshold analysis should be understood to be exemplary, and should not be construed as being limiting in any way.

As will be explained in more detail below, instead of applying one optimal normal distribution graph to the shellcode curve, the test engine 110 applies a number of candidate normal distribution graphs to the shellcode curve, and computes the difference between each candidate normal distribution graph and the shellcode curve, and derives a line function that best fits the differences. A line function approximating the trend of the differences is analyzed to determine if the line function substantially matches a pattern that is consistent with a legitimate shellcode and/or if the derivative of the line does not match the pattern consistent with the legitimate shellcode. These and other aspects of the method 300 are set forth below.

The method 300 begins at operation 302, wherein the test engine 110 computes a number k of $E(\sigma)$ values. The number k is the number of candidate normal distribution graphs to apply. The number k may be chosen based upon empirical analysis, system or user preferences, or other considerations.

The k data points are obtained, each data point corresponding to a value $(\sigma_i, E(\sigma_i))$, where i=1, 2, . . . , k and $\sigma_0 \leq \sigma_i \leq \sigma_{max}$. The test engine 110 applies linear least squares to the k data values, resulting in the data set modeled as a line function $$L(\sigma) = \hat{E}(\sigma) = \begin{cases} m_1\sigma + b_1 & \text{for } \sigma \leq w \\ m_2\sigma + b_2 & \text{for } \sigma \geq w \end{cases}$$

where $\hat{E}\,w) \leq \hat{E}(\sigma)$ for all $\sigma$, and $\sigma_1 \leq w \leq \sigma_k$.

From operation 302, the method 300 proceeds to operation 304, wherein the test engine 110 derives a line function $L(\sigma)$ for the data set forth above. The line function $L(\sigma)$ includes two straight lines and has one global minimum located atw. To determine if the shellcode finding 108 is legitimate, the test engine 110 evaluates the line function $L(\sigma)$ to determine if the line function $L(\sigma)$ matches a pattern assumed to be consistent with a legitimate shellcode finding.

As mentioned above, a line function $L(\sigma)$ will be assumed to be consistent with a legitimate shellcode finding 108 if the line function $L(\sigma)$ matches a particular pattern. In particular, the pattern consists of a first line with a negative slope and a global minimum located at $(w, L(w))$. The pattern further consists of a second line with a positive slope and a global minimum located at $(w, L(w))$. The test engine 110 can determine if the line function $L(\sigma)$ matches this pattern by calculating the four parameters of $L(\sigma)$, which are $m_1$, $m_2$, $b_1$, and $b_2$ via a known method.

From operation 304, the method 300 proceeds to operation 306, wherein the test engine 110 determines, based upon a pattern associated with the line function $L(\sigma)$, if the shellcode finding is legitimate. As explained above, the test engine 110 compares the line function $L(\sigma)$ to a known pattern associated with legitimate shellcode findings 108. In terms of the above identified $m_1$ and $m_2$, the shellcode finding 108 evaluated is legitimate if, and only if $$\hat{E}'(\sigma) = \begin{cases} m_1 < 0 & \text{for } \sigma \leq w \\ m_2 > 0 & \text{for } \sigma \geq w \end{cases} \text{ and } \left|\frac{k}{2} - w\right| < \alpha,$$

where $\alpha$ is a defined small value. The value of $\alpha$ can be almost any value set by preferences, or the like, and can vary depending upon the type of shellcode evaluated, and the like. If the above calculation is not true, the shellcode finding 108 is a false positive. An example of a legitimate shellcode finding 108 is shown in FIG. 4A, and an example of a false positive shellcode finding 108 is shown in FIG. 4B.

Although not illustrated in FIG. 3, the test engine 110 can generate output indicating whether the shellcode finding 108 is legitimate or not legitimate. In some embodiments, for example, the test engine 110 passes an indication to a user of the test engine 110 or the shellcode scanner 102. The indication can inform the user that the shellcode finding 108 is a false positive or legitimate. Other output is possible, but is not described herein in additional detail. The method 300 ends at operation 308.

Figure 4B:
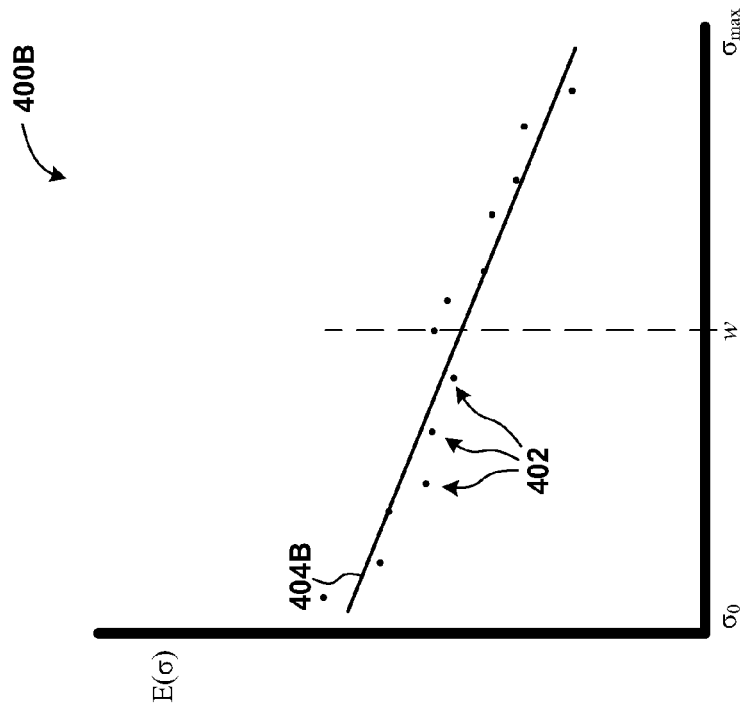
FIGS. 4A and 4B are graphs illustrating exemplary shellcode models built during evaluation of shellcode findings, according to exemplary embodiments.
Figure 4A:
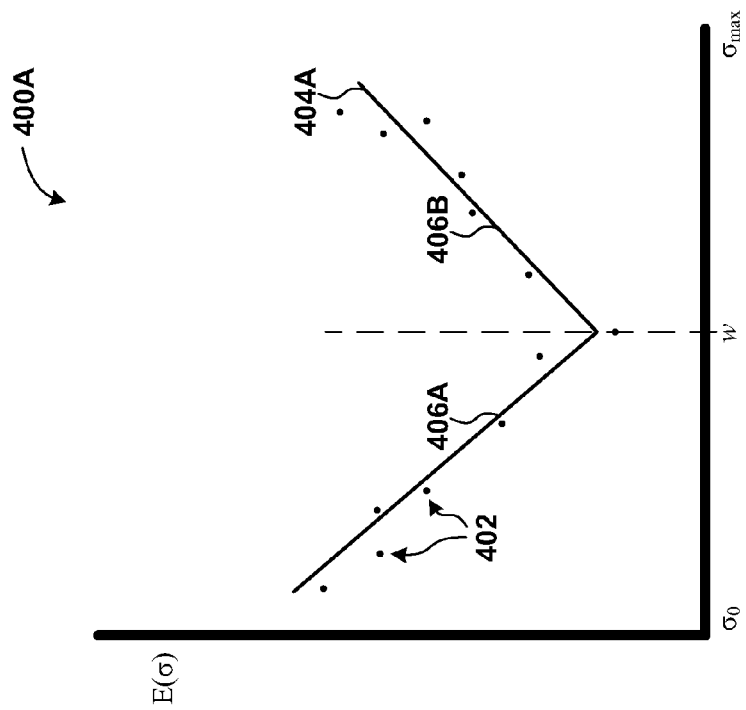

Turning now to FIGS. 4A and 4B, exemplary shellcode models based upon analysis of a shellcode finding 108 are illustrated, according to exemplary embodiments. More particularly, FIG. 4A illustrates an exemplary shellcode model 400A derived during a threshold free analysis of a legitimate shellcode finding 108. As illustrated, the shellcode model 400A includes a number of values 402, which correspond to the data points $\sigma$, $E(\sigma)$, as discussed above with reference to FIG. 3. The shellcode model 400A also includes line function 404A, which can be formed by two straight lines 406A, 406B. As shown in FIG. 4A, the first line 406A has a negative slope $m_1$ for $\sigma < w$. The second line 406B has a positive slope $m_2$ for $\sigma > w$. Thus, the pattern of the shellcode model 400A is consistent with a pattern known to be associated with legitimate shellcode findings 108, as explained above.

FIG. 4B illustrates an exemplary shellcode model 400B derived during a threshold free analysis of a shellcode curve corresponding to a false positive shellcode finding 108. As illustrated, the shellcode model 400B includes a number of values 402, which correspond to the data points $\sigma$, $E(\sigma)$, as discussed above with reference to FIG. 3. The shellcode model 400B also includes a line function 404B. As shown in FIG. 4B, the line function 404B does not follow the pattern associated with legitimate shellcode findings 108. In particular, the line 404B does not have a negative slope $m_1$ for $\sigma < w$ and/or a positive slope $m_2$ for $\sigma > w$. Thus, the shellcode model 400B is associated with a false positive shellcode finding 108.

Figure 5:
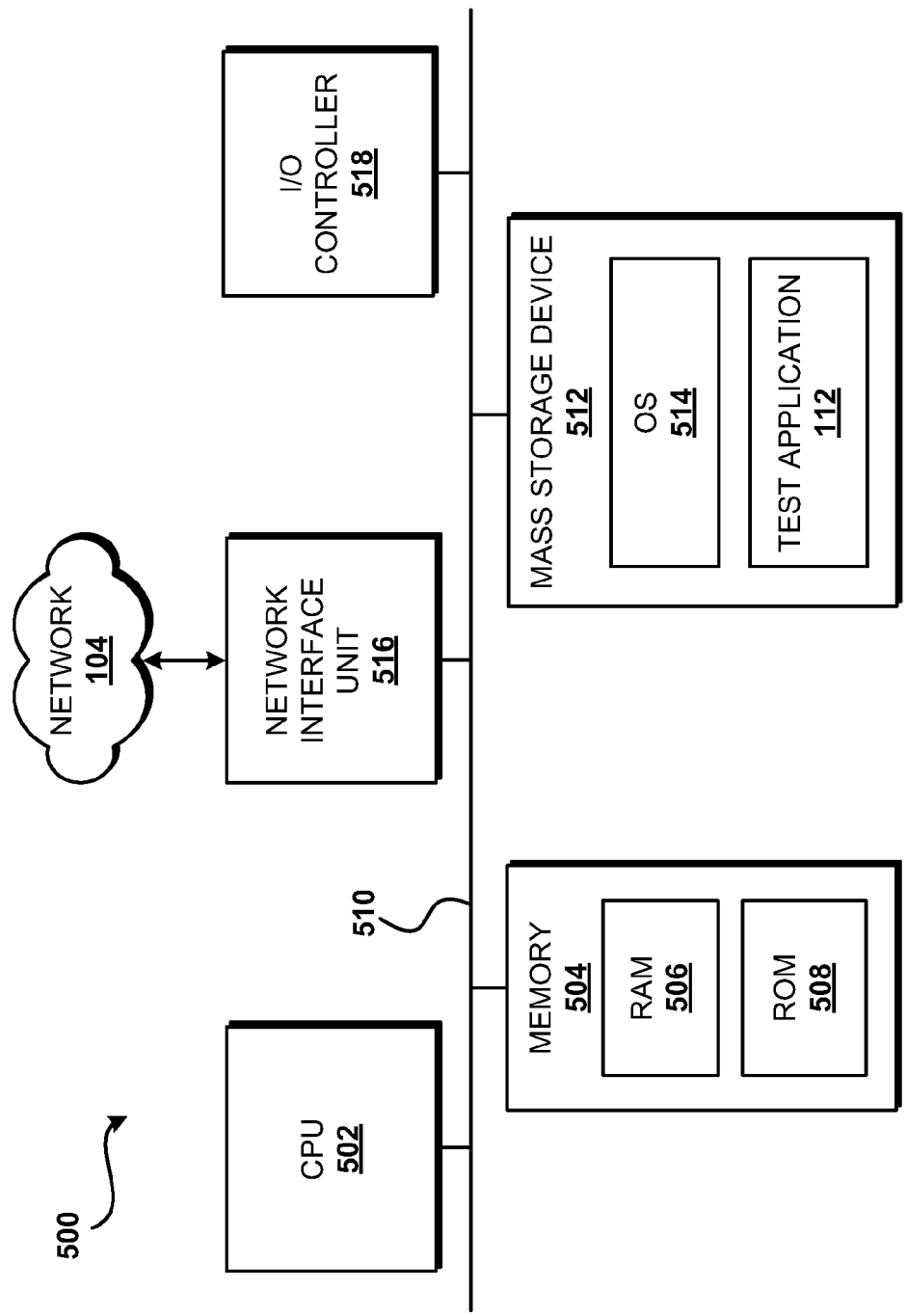
FIG. 5 is a computer architecture diagram illustrating an exemplary computer hardware and software architecture for a computing system capable of implementing aspects of the embodiments presented herein.

FIG. 5 illustrates an exemplary computer architecture 500 for a device capable of executing the software components described herein for detecting false positive shellcode. Thus, the computer architecture 500 illustrated in FIG. 5 illustrates an architecture for a server computer, mobile phone, a PDA, a smart phone, a server computer, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 514 and the test application 112.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of this specification and the claims, the phrase "computer-readable storage medium" and variations thereof, does not include waves, signals, and/or other transitory and/or intangible communication media.

According to various embodiments, the computer architecture 500 may operate in a networked environment using logical connections to remote computers through a network such as the network 104. The computer architecture 500 may connect to the network 104 through a network interface unit 516 connected to the bus 510. It should be appreciated that the network interface unit 516 also may be utilized to connect to other types of networks and remote computer systems, for example, the shellcode scanner 102 and/or the memory 106. The computer architecture 500 also may include an input/output controller 518 for receiving and processing input from a number of other devices, including a keyboard, mouse, or electronic stylus (not shown in FIG. 5). Similarly, the input/output controller 518 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for detecting false positive shellcode findings have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for evaluating a shellcode finding associated with a memory, the computer-implemented method comprising performing computer-implemented operations for:
receiving, at a computer executing a test application, the shellcode finding;
obtaining, at the computer, a plurality of samples from the memory, each of the samples being taken from a respective memory address;
determining, at the computer, bit-level entropy values corresponding, respectively, to the bit-level entropy of the memory at the memory addresses corresponding to the respective samples;
generating, at the computer, a shellcode curve that passes through the bit-level entropy values;
fitting, at the computer, an optimal normal distribution graph to the shellcode curve; and
analyzing, at the computer, the optimal normal distribution graph and the shellcode curve to determine if the shellcode finding is legitimate.

2. The method of claim 1, wherein the shellcode finding is received from a shellcode scanner.

3. The method of claim 1, wherein the shellcode curve comprises a cubic spline having a number of piecewise polynomials.

4. The method of claim 3, wherein one of the piecewise polynomials begins at a first bit-level entropy value associated with one of the plurality of samples, and ends at a second bit-level entropy value associated with another of the plurality of samples.

5. The method of claim 4, wherein the first bit-level entropy value and the second bit-level entropy value are subsequent bit-level entropy values associated with the plurality of samples.

6. The method of claim 1, wherein analyzing the optimal distribution graph and the shellcode curve further comprises:
calculating an absolute value of the difference between the optimal distribution graph and the shellcode curve;
comparing the absolute value to a threshold value; and
determining that the shellcode finding is legitimate, in response to determining that the absolute value is less than the threshold value.

7. The method of claim 6, further comprising:
determining a confidence value associated with the difference calculated between the optimal distribution graph and the shellcode curve;
comparing the confidence value to a defined confidence threshold value; and
determining that the shellcode finding is legitimate, in response to determining that the absolute value is less than the threshold value, and that the confidence value is greater than the defined confidence threshold value.

8. The method of claim 6, further comprising performing additional analysis of the shellcode finding, in response to determining that the absolute value is greater than the threshold value.

9. The method of claim 1, wherein fitting the optimal normal distribution graph to the shellcode curve comprises fitting a plurality of normal distribution graphs to the shellcode curve, and wherein analyzing the optimal normal distribution graph and the shellcode curve to determine if the shellcode finding is legitimate comprises:
computing a plurality of difference values, each of the plurality of difference values comprising a difference between one of the plurality of normal distribution graphs and the shellcode curve;
deriving a line function that represents the difference values; and
comparing the line function to an expected pattern corresponding to a pattern for a line function associated with a legitimate shellcode finding.

10. The method of claim 9, wherein deriving the line function comprises deriving two lines and determining a global minimum.

11. The method of claim 10, wherein the shellcode finding is confirmed as legitimate if
a first of the two lines has a negative slope,
a second of the two lines has a positive slope, and
the global minimum is located proximate to the center of the domain of the line function.

12. The method of claim 11, wherein if the shellcode finding is not confirmed as legitimate if
the first of the two lines does not have a negative slope, or
the second of the two lines does not have a positive slope.

13. A computer-implemented method for evaluating a shellcode finding associated with a memory, the computer-implemented method comprising performing computer-implemented operations for:
receiving, at a computer executing a test application, the shellcode finding, the shellcode finding comprising a memory address and being generated by a shellcode scanner in communication with the memory;
obtaining, at the computer, a plurality of samples from the memory, each of the samples being obtained from respective memory addresses that are proximate to the memory address of the shellcode finding;
determining, at the computer, a bit-level entropy value for each of the plurality of samples, the bit-level entropy values corresponding to bit-level entropy levels of the memory at the memory addresses of the plurality of samples;
generating, at the computer, a cubic spline comprising a plurality of piecewise polynomials, each of the piecewise polynomials extending between two bit-level entropy values;
fitting, at the computer, an optimal normal distribution graph to the cubic spline; and
analyzing, at the computer, the optimal normal distribution graph and the cubic spline to determine if the shellcode finding is legitimate.

14. The method of claim 13, wherein one of the piecewise polynomials begins at a first bit-level entropy value associated with one of the plurality of samples, and ends at a second bit-level entropy value associated with another of the plurality of samples.

15. The method of claim 14, wherein the first bit-level entropy value and the second bit-level entropy value are subsequent bit-level entropy values associated with the plurality of samples.

16. The method of claim 13, wherein analyzing the optimal distribution graph and the cubic spline further comprises:
calculating an absolute value of the difference between the optimal distribution graph and the cubic spline;
comparing the absolute value to a threshold value; and
determining that the shellcode finding is legitimate, in response to determining that the absolute value is less than the threshold value.

17. The method of claim 16, further comprising:
in response to determining that the absolute value is greater than the threshold value, fitting a plurality of normal distribution graphs to the cubic spline, computing a plurality of difference values, each of the plurality of difference values comprising a difference between one of the plurality of normal distribution graphs and the cubic spline, deriving a line function that represents the difference values, and comparing the line function to an expected pattern corresponding to a pattern for a line function associated with a legitimate shellcode finding.

18. The method of claim 17, wherein deriving the line function comprises deriving two lines and determining a global minimum.

19. The method of claim 18, wherein
the shellcode finding is confirmed as legitimate if
  a first of the two lines has a negative slope,
  a second of the two lines has a positive slope, and
  the global minimum is located proximate to the center of the domain of the line function, and
the shellcode finding is not confirmed as legitimate if
  the first of the two lines does not have a negative slope, or
  the second of the two lines does not have a positive slope.

20. A computer-readable storage medium having computer readable instructions stored thereupon that, when executed by a computer, cause the computer to:

receive the shellcode finding associated with a memory, the shellcode finding being generated by a shellcode scanner in communication with the memory;

obtain a plurality of samples from the memory;

determine a bit-level entropy value for each of the plurality of samples, the bit-level entropy values corresponding to bit-level entropy levels of the memory at memory addresses of the plurality of samples;

generate a shellcode curve comprising a plurality of piecewise polynomials, each of the piecewise polynomials extending between two bit-level entropy values;

fit an optimal normal distribution graph to the shellcode curve;

calculate an absolute value of the difference between the optimal distribution graph and the shellcode curve;

compare the absolute value to a threshold value;

determine that the shellcode finding is legitimate, in response to determining that the absolute value is less than the threshold value;

in response to determining that the absolute value is greater than the threshold value, fit a plurality of normal distribution graphs to the cubic spline, compute a plurality of difference values, each of the plurality of difference values comprising a difference between one of the plurality of normal distribution graphs and the cubic spline, derive a line function that represents the difference values, compare the line function to an expected pattern corresponding to a pattern for a line function associated with a legitimate shellcode finding, wherein the shellcode finding is confirmed as legitimate if
  a first of the two lines has a negative slope,
  a second of the two lines has a positive slope, and
  the global minimum is located proximate to the center of the domain of the line function, and
the shellcode finding is not confirmed as legitimate if
  the first of the two lines does not have a negative slope, or
  the second of the two lines does not have a positive slope.

* * * * *